United States Patent
Liu (10) Patent No.: US 11,070,659 B2
(45) Date of Patent: Jul. 20, 2021

(54) INCOMING VOICE CALLING METHOD AND TERMINAL

(71) Applicant: Huawei Technologies Co., Ltd., Shenzhen (CN)

(72) Inventor: Xiangning Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/649,463

(22) PCT Filed: Jul. 16, 2018

(86) PCT No.: PCT/CN2018/095754
§ 371 (c)(1),
(2) Date: Mar. 20, 2020

(87) PCT Pub. No.: WO2019/062285
PCT Pub. Date: Apr. 4, 2019

(65) Prior Publication Data
US 2020/0304627 A1  Sep. 24, 2020

(30) Foreign Application Priority Data
Sep. 30, 2017  (CN) .......................... 201710917006.9

(51) Int. Cl.
*H04M 1/725*  (2021.01)
*H04M 3/02*  (2006.01)
(Continued)

(52) U.S. Cl.
CPC ..... *H04M 1/7243* (2021.01); *H04M 1/72469* (2021.01); *H04M 3/02* (2013.01)

(58) Field of Classification Search
CPC ........ H04M 3/42042; H04M 3/42051; H04M 1/57; H04M 5/20; H04M 1/7243; H04M 1/72469; H04M 3/02
(Continued)

(56) References Cited

U.S. PATENT DOCUMENTS 8,903,058 B2  12/2014  Narayanan
9,167,082 B2  10/2015  Goldstein
(Continued)

FOREIGN PATENT DOCUMENTS

CN  101010975 A  8/2007
CN  101252701 A  8/2008
(Continued)

OTHER PUBLICATIONS

Translation of CN 101252701 (Year: 2008).*
(Continued)

*Primary Examiner* — Lee Nguyen
(74) *Attorney, Agent, or Firm* — Conley Rose, P.C.

(57) ABSTRACT

A first terminal sends a multimedia file to a server; the first terminal receives a multimedia identifier sent by the server, where the multimedia identifier is used to represent a location of the multimedia file in the server; the first terminal sends the multimedia identifier to a second terminal; the first terminal sends a call request to the second terminal, so that the second terminal plays the multimedia file. Call intention information is played to the second terminal through multimedia, so that a user of the second terminal obtains the call intention information in time.

20 Claims, 9 Drawing Sheets

(51) Int. Cl.
*H04M 1/7243* (2021.01)
*H04M 1/72469* (2021.01)

(58) Field of Classification Search
USPC .............................. 379/88.13; 455/415, 567
See application file for complete search history.

(56) References Cited

U.S. PATENT DOCUMENTS

| | | |
|---|---|---|
| 9,762,729 B1 | 9/2017 | Sales et al. |
| 2005/0287997 A1 | 12/2005 | Fournier |
| 2007/0064921 A1 | 3/2007 | Albukerk et al. |
| 2007/0161412 A1 | 7/2007 | Nevid et al. |
| 2009/0264112 A1 | 10/2009 | De Zen et al. |
| 2011/0014932 A1 | 1/2011 | Estevez |
| 2013/0157728 A1* | 6/2013 | Hu .................... H04M 3/42017 455/567 |
| 2015/0026354 A1 | 1/2015 | Zhao |
| 2016/0344865 A1 | 11/2016 | Ehlen et al. |
| 2017/0085960 A1* | 3/2017 | Ye ........................ H04N 21/233 |

FOREIGN PATENT DOCUMENTS

| | | |
|---|---|---|
| CN | 102075605 A | 5/2011 |
| CN | 104092705 A | 10/2014 |
| CN | 105141880 A | 12/2015 |
| CN | 106254618 A | 12/2016 |
| CN | 106850949 A | 6/2017 |
| EP | 2575337 A1 | 4/2013 |

OTHER PUBLICATIONS

Translation of CN 105141880 (Year: 2015).*
Translation of PCT/CN2018/095754 Written Opinion (Year: 2020).*
"Enriched Calling Technical Specification," Version 2.0, Official Document RCC.20, Mar. 21, 2016, 50 pages.

* cited by examiner (PRIOR ART)

First terminal | Server | Second terminal

Step 401. SIP session establishment request message

Step 402. SIP session establishment response message

Step 403. MSRP session establishment request message

Step 404. MSRP session establishment response message

Step 405. Obtain a voice file on a call composer interface

Step 406. The first terminal sends a voice file to the server

Step 407. The server sends a voice identifier to the first terminal

Step 408. The first terminal sends a first message to the second terminal

Step 409. The second terminal sends a second message to the first terminal

Step 410. The second terminal sends a third message to the server

Step 411. The server sends a fourth message to the second terminal

Step 412. The first terminal sends a call request to the second terminal

Set an incoming voice call contact list

Step 413. The second terminal identifies that the incoming voice call contact list includes a contact number that is consistent with a number of a calling contact, and plays the voice file

INCOMING VOICE CALLING METHOD AND TERMINAL

CROSS-REFERENCE TO RELATED APPLICATIONS

This application is a National Stage of International Patent Application No. PCT/CN2018/095754 filed on Jul. 16, 2018, which claims priority to Chinese Patent Application No. 201710917006.9 filed on Sep. 30, 2017. Both of the aforementioned applications are hereby incorporated by reference in their entireties.

TECHNICAL FIELD

Embodiments of this application relate to the field of communications technologies, and in particular, to an incoming voice call method and a terminal.

BACKGROUND

Figure 1A:
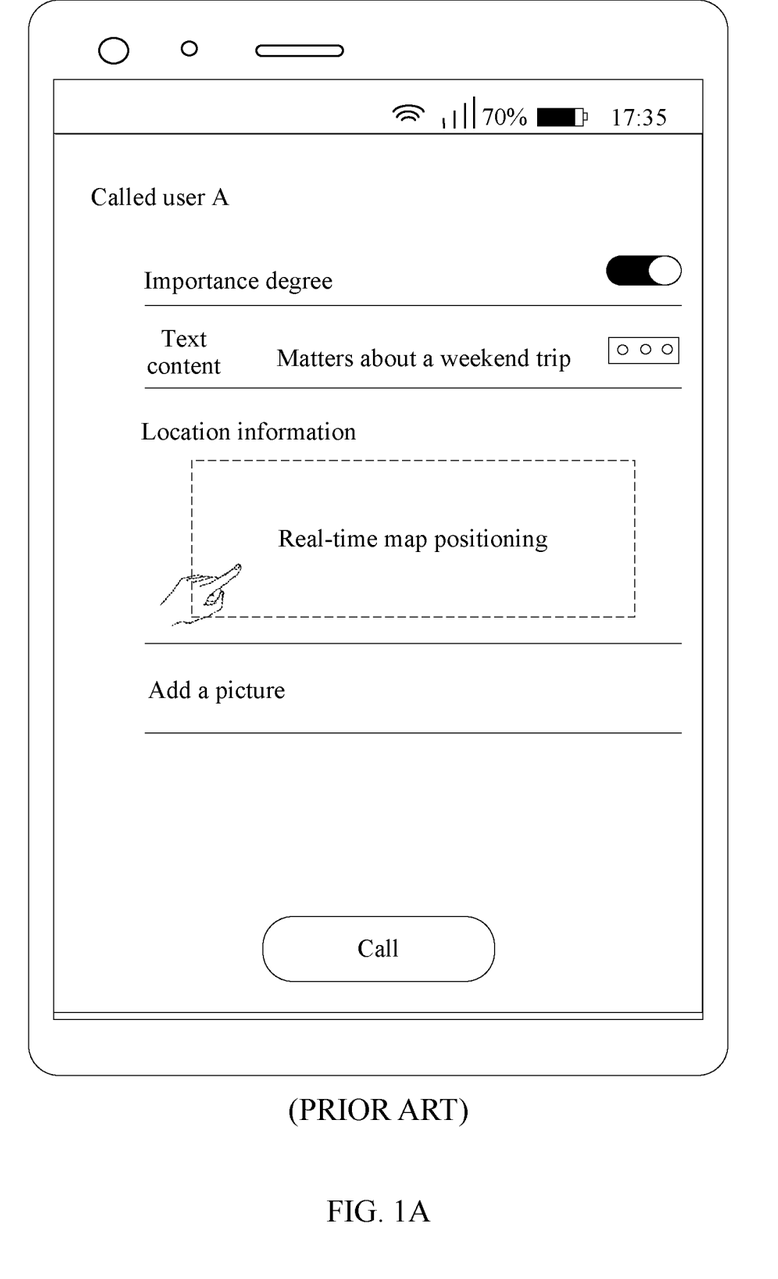
FIG. 1A is a schematic diagram of a process of setting a mobile phone interface by a calling party.
Figure 1B:
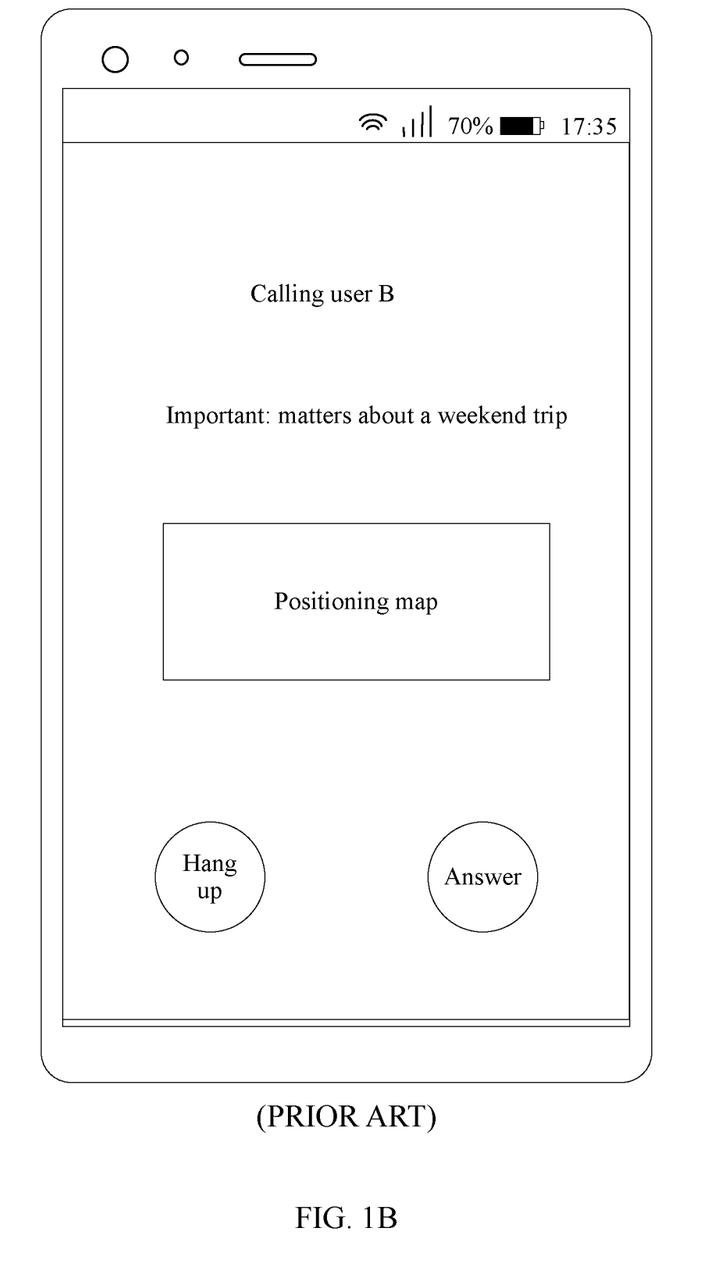
FIG. 1B is a schematic diagram of a mobile phone interface of a called party when a mobile phone of the called party receives a call.

In product definition specifications of rich communication suites (Rich Communication Suites, RCS) enriched calling (Enriched Calling) of the global system for mobile communications assembly (GSMA), a call composer (Call Composer) interface (or referred to as a dial-up interface) is proposed as a solution, to provide a current call intention for a called party. A calling user may compile at least one element of an importance degree, text content, picture information, and location information of a current call on the call composer interface before dialing a terminal (for example, a mobile phone), and when the terminal (for example, the mobile phone) receives an incoming call, the corresponding element set by the calling user may be displayed on an incoming call interface for a called user. FIG. 1A is a schematic diagram of a process of setting a mobile phone interface by a calling party. The mobile phone interface may include a name "A" of a called user, an importance degree, "important", set by the user, text content "matters about a weekend trip", picture information "none" (no picture is added), and location information that is obtained through map positioning. FIG. 1B is a schematic diagram of a mobile phone interface of a called party when a mobile phone of the called party receives a call. The mobile phone interface may include a name "B" of a calling user, "important", "matters about a weekend trip", and location information of the calling user B. and the called user may choose, based on the displayed information, to answer the call or hang up the call.

However, in the foregoing implementation solution, a call intention of a user needs to be transmitted by using characters. Because content expressed in characters is limited, the expressed content is incomplete. In addition, if the mobile phone is not at the user's side during an incoming call, and the user only hears a ringtone but does not see an incoming call interface, call intention information cannot be obtained in time, causing inconvenience to the user.

SUMMARY

For a prior-art technical problem of low call efficiency caused because a call intention is transmitted in characters, embodiments of the present invention provide an incoming voice calling method and a terminal. A first terminal (a calling user) plays call intention information to a second terminal (a called user) through voice, so that the second terminal (the called user) obtains the call intention information in time, thereby improving user experience.

According to a first aspect, an incoming voice calling method is provided, where the method may include: sending, by a first terminal, a multimedia file (for example, a voice file) to a server; receiving, by the first terminal, a multimedia identifier sent by the server, where the multimedia identifier is used to represent a location of the multimedia file in the server; sending, by the first terminal, the multimedia identifier to a second terminal; and sending, by the first terminal, a call request to the second terminal, so that the second terminal plays the multimedia file on an incoming call interface based on the call request. According to the method, call intention information is played to the second terminal through voice, so that a user of the second terminal obtains the call intention information in time, thereby improving user experience.

In an optional implementation, before the sending, by a first terminal, a multimedia file to a server, the method further includes: setting, by the first terminal, at least one contact category list; and the sending, by the first terminal, the multimedia identifier to a second terminal includes: sending, by the first terminal, a same multimedia identifier to a same category of contacts, to reduce time used by a user to set a call intention.

In an optional implementation, within a preset time period, the first terminal has sent at least two multimedia files to the server, and the first terminal has received at least two multimedia file identifiers; and the sending, by the first terminal, the multimedia identifier to a second terminal includes: sending, by the first terminal, a same multimedia identifier to the second terminal within the preset time period.

In an optional implementation, the sending, by the first terminal, the multimedia identifier to a second terminal includes: sending, by the first terminal to the second terminal, a multimedia identifier specified by the first terminal; or sending, by the first terminal to the second terminal, a multimedia identifier that is obtained by the first terminal at a last time point.

In an optional implementation, the multimedia file is a multimedia file recorded by a user; or the multimedia file is a multimedia file downloaded by a user from the server, to provide a plurality of multimedia file obtaining manners for the user.

In an optional implementation, the multimedia file includes user characteristic information of the first terminal; and the sending, by a first terminal, a multimedia file to a server includes: sending, by the first terminal to the server, the multimedia file carrying the user characteristic information.

In an optional implementation, the multimedia file is a multimedia file that is set by a user of the first terminal based on a preset multimedia template, to provide a plurality of multimedia file forms for the user.

In an optional implementation, the sending, by a first terminal, a multimedia file to a server includes: sending, by the first terminal, the multimedia file on a dial-up interface.

According to a second aspect, an incoming voice calling method is provided, where the method may include: receiving, by a first terminal, a multimedia identifier of a second terminal, where the multimedia identifier is used to represent a location of a multimedia file in a server; sending, by the first terminal, the multimedia identifier to the server; receiving, by the first terminal, the multimedia file sent by the server; receiving, by the first terminal, a call request sent by the second terminal, where the call request includes a call number of the second terminal; and playing, by the first terminal, the multimedia file.

In an optional implementation, the playing, by the first terminal, the multimedia file, includes: if the first terminal determines that the call number of the second terminal is a preset contact number, playing, by the first terminal, the multimedia file; or if the first terminal determines that a user of the second terminal is a preset user, playing, by the first terminal, the multimedia file.

In an optional implementation, the playing, by the first terminal, the multimedia file includes: if the multimedia file is a voice file, playing, by the first terminal, the voice file as an incoming call ringtone; or if the multimedia file is a voice file, playing, by the first terminal, the voice file as an incoming call ringtone, and displaying a preset image on an incoming call interface; or if the multimedia file is a video file, playing, by the first terminal, the video file; or if the multimedia file is a video file, displaying, by the first terminal, an image of the video file, and playing voice of the video file as an incoming call ringtone.

In an optional implementation, the receiving, by a first terminal, a multimedia identifier sent by a second terminal includes: when there are a plurality of multimedia identifiers, receiving, by the first terminal, a multimedia identifier specified by the second terminal; or receiving, by the first terminal, a multimedia identifier that is sent by the second terminal at a last time point.

In an optional implementation, the playing, by the first terminal, the multimedia file includes: downloading, by the first terminal, the multimedia file, and then playing the multimedia file; or playing, by the first terminal, the multimedia file in a process of downloading the multimedia file.

According to a third aspect, a terminal is provided, where the terminal has a function of implementing behavior of the first terminal in the method in the first aspect. The function may be implemented by using hardware, or may be implemented by hardware executing corresponding software. The hardware or software includes one or more modules corresponding to the foregoing function.

According to a fourth aspect, a terminal is provided, where the terminal has a function of implementing behavior of the first terminal in the method in the second aspect. The function may be implemented by using hardware, or may be implemented by hardware executing corresponding software. The hardware or software includes one or more modules corresponding to the foregoing function.

According to a fifth aspect, a terminal is provided, where the terminal may include a transmitter and a receiver. The transmitter is configured to send a multimedia file to a server. The receiver is configured to receive a multimedia identifier sent by the server, where the multimedia identifier is used to represent a location of the multimedia file in the server. The transmitter is further configured to send the multimedia identifier to a second terminal. The transmitter is further configured to: when the second terminal is a called terminal and the terminal is a calling terminal, send a call request to the second terminal, so that the second terminal plays the multimedia file.

In an optional implementation, the terminal further includes a processor, where the processor is configured to set at least one contact category list; and the transmitter is further configured to send a same multimedia identifier to a same category of contacts.

In an optional implementation, the transmitter is further configured to send a same multimedia identifier to the second terminal within a preset time period.

In an optional implementation, within a preset time period, the transmitter has sent at least two multimedia files to the server, and the receiver has received at least two multimedia file identifiers; and the transmitter is further configured to: send, to the second terminal, a multimedia identifier specified by the first terminal; or send, to the second terminal, a multimedia identifier that is obtained by the terminal at a last time point.

In an optional implementation, the multimedia file is a multimedia file recorded by a user; or the multimedia file is a multimedia file downloaded by a user from the server.

In an optional implementation, the multimedia file includes user characteristic information of the terminal, and the transmitter is specifically configured to send, to the server, the multimedia file carrying the user characteristic information.

In an optional implementation, the multimedia file is a multimedia file that is set by the user of the terminal based on a preset multimedia template.

In an optional implementation, the transmitter is specifically configured to send the multimedia file on a dial-up interface.

According to a sixth aspect, a terminal is provided, where the terminal may include: a receiver, a transmitter, and a player. The receiver is configured to receive a multimedia identifier sent by a second terminal, where the multimedia identifier is used to represent a location of a multimedia file corresponding to the multimedia identifier in a server. The transmitter is configured to send the multimedia identifier to the server. The receiver is further configured to receive the multimedia file sent by the server. The receiver is further configured to receive a call request sent by the second terminal. The player plays the multimedia file.

In an optional implementation, the terminal further includes a processor, where if the processor determines that a call number of the second terminal is a preset contact number, the player plays the multimedia file; or if the processor determines that a user of the second terminal is a preset user, the player plays the multimedia file.

In an optional implementation, the player is configured to: if the multimedia file is a voice file, play the voice file as an incoming call ringtone; or if the multimedia file is a voice file, play the voice file as an incoming call ringtone, and display a preset image on an incoming call interface; or if the multimedia file is a video file, play the video file; or if the multimedia file is a video file, display an image of the video file, and play voice of the video file as an incoming call ringtone.

In an optional implementation, the receiver is configured to: when there are a plurality of multimedia identifiers, receive a multimedia identifier specified by the second terminal; or receive a multimedia identifier that is sent by the second terminal at a last time point.

In an optional implementation, the player is further configured to: download the multimedia file, and then play the multimedia file; or play the multimedia file in a process of downloading the multimedia file.

According to a fourth aspect, a computer program product including an instruction is provided, where when the computer program product is run on a computer, the computer is enabled to perform the method described in the first aspect or the second aspect.

According to a fifth aspect, a computer readable storage medium is provided. The computer readable storage medium stores a computer program, and when the program is executed by a processor, the method described in the first aspect or the second aspect is performed.

DESCRIPTION OF EMBODIMENTS

Figure 2:
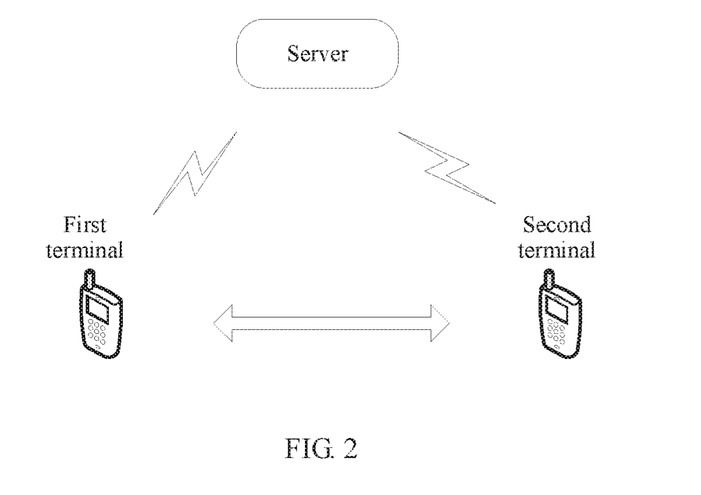
FIG. 2 is a schematic diagram of a system architecture according to an embodiment of the present invention.
Figure 3:
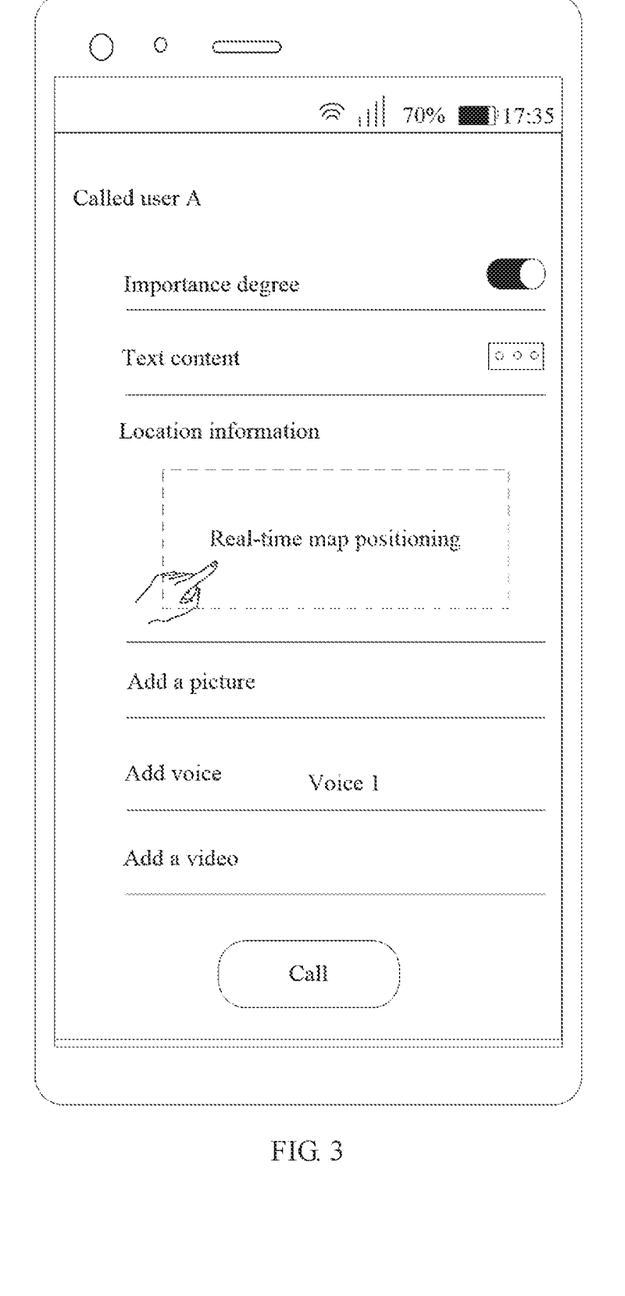
FIG. 3 is a schematic diagram of a process of setting a mobile phone interface by a calling party according to an embodiment of the present invention.

An incoming voice calling method provided in this application may be applied to a system architecture shown in FIG. 2. As shown in FIG. 2, the system may include a first terminal, a second terminal, and a server. The server may be a hyper text transfer protocol (Hyper Text Transfer Protocol, HTTP) server (Web server), and the first terminal and the second terminal may be user equipment (user equipment, UE) in various forms, for example, mobile phones, used for inter-terminal calling, and a call composer interface in a GSMA RCS Enriched Calling product definition specification is configured on each of the first terminal and the second terminal. The call composer interface is used for a calling user to edit call intention information, so that a called user answers or rejects a call of the calling user based on the call intention information of the calling user. Attribute information may be set on the call composer interface, to manage a terminal interface of the called user before a call, where the attribute information may include voice information, an importance degree of the call, text content, picture information, location information, video information, and the like. FIG. 3 is a schematic diagram of the call composer interface. The Call Composer interface may include a name of a called user, an importance degree, "important", of a current call, text content (not added), picture information (not added), location information that is obtained through map positioning, a voice file "voice 1", and a video file (not added).

It may be understood that when editing the call intention information, the calling user may add only a voice file and does not edit other information.

Further, the first terminal supports an HTTP protocol, a message session relay protocol (Message Session Relay Protocol, MSRP), and a session initiation protocol (Session Initiation Protocol, SIP), and the second terminal also supports the HTTP protocol, the MSRP protocol, and the SIP protocol. The SIP protocol is used to complete SIP session establishment between the first terminal and the second terminal, and the MSRP protocol is used to transmit a message in an established SIP session to complete an information exchange process.

The first terminal and the second terminal may upload file information in various forms to the server side by using the HTTP protocol, or the first terminal and the second terminal may download files in various forms from the server side by using the HTTP protocol.

In the incoming voice calling method provided in this application, a voice element is defined in an extensible markup language (Extensible Markup Language, XML) format of an RCS transmission technology, so that transmission of a voice element message body (a voice format) in a transmission process is added, and an existing protocol definition process is reused in technology implementation.

An XML body (body) in which the voice element is defined is defined as follows:

```
<?xml version="1.0"encoding="UTF-8"?>
<rcsenvelope xmlns="urn:gsma:params:xml:ns:rcs:rcs:calldata">
<rcscalldata >
<subject>subject1</subject>
<composerid>12345</composerid>
<audiourl>URL1</audiourl>
</rcscalldata>
</rcsenvelope>
```

Before the first terminal calls the second terminal, the first terminal may record, on the call composer interface, a segment of multimedia file (for example, a voice file or a video file) as call intention information, and upload the multimedia file to the server, and the second terminal downloads the multimedia file from the server and stores the multimedia file. When the first terminal calls the second terminal, the voice, instead of an incoming call ringtone, is played on an incoming call interface of the second terminal, so that a user of the second terminal conveniently receives the call intention information, and the second terminal determines, based on the call intention information, whether to answer the call. If the user of the second terminal is in a busy state and cannot answer the call, and hears that a call intention of the first terminal is "matters about a weekend trip", the second terminal may choose to hang up or not to answer the call for the call content, and then reply when free.

Further, for security consideration of incoming voice, the second terminal may make such a setting that the function is enabled only for at least one specified contact. For example, the second terminal may set a whitelist locally, and only for a user in the whitelist, voice information of a peer party is played in time during an incoming call, to prevent harassment.

It may be understood that an implementation process of the foregoing technical solution is described by using an example in which the first terminal is a calling party, and the second terminal is a called party. When the first terminal is a called party, and the second terminal is a calling party, the implementation process of the foregoing technical solution is also applicable, and details are not described herein again.

In conclusion, a user of the first terminal may record voice on the call composer interface before making a call. Compared with the prior art that text is edited to express call intention information, in this application, voice definition is extended in a call composer of the enriched calling, and voice recording is convenient and quick in an operation. The call intention information is played to the second terminal through voice, so that the user of the second terminal obtains the call intention information in time, thereby improving user experience.

It should be noted that when a call intention is presented by using a video file, in this application, a video display solution of extending an incoming call by using an RCS enriched calling protocol may be used, that is, a video element is defined in an XML format of an RCS transmission technology, so that transmission of a voice element message body (a video format) in a transmission process is added.

The following provides detailed descriptions by using an example in which a multimedia file is a voice file.

Figure 4:
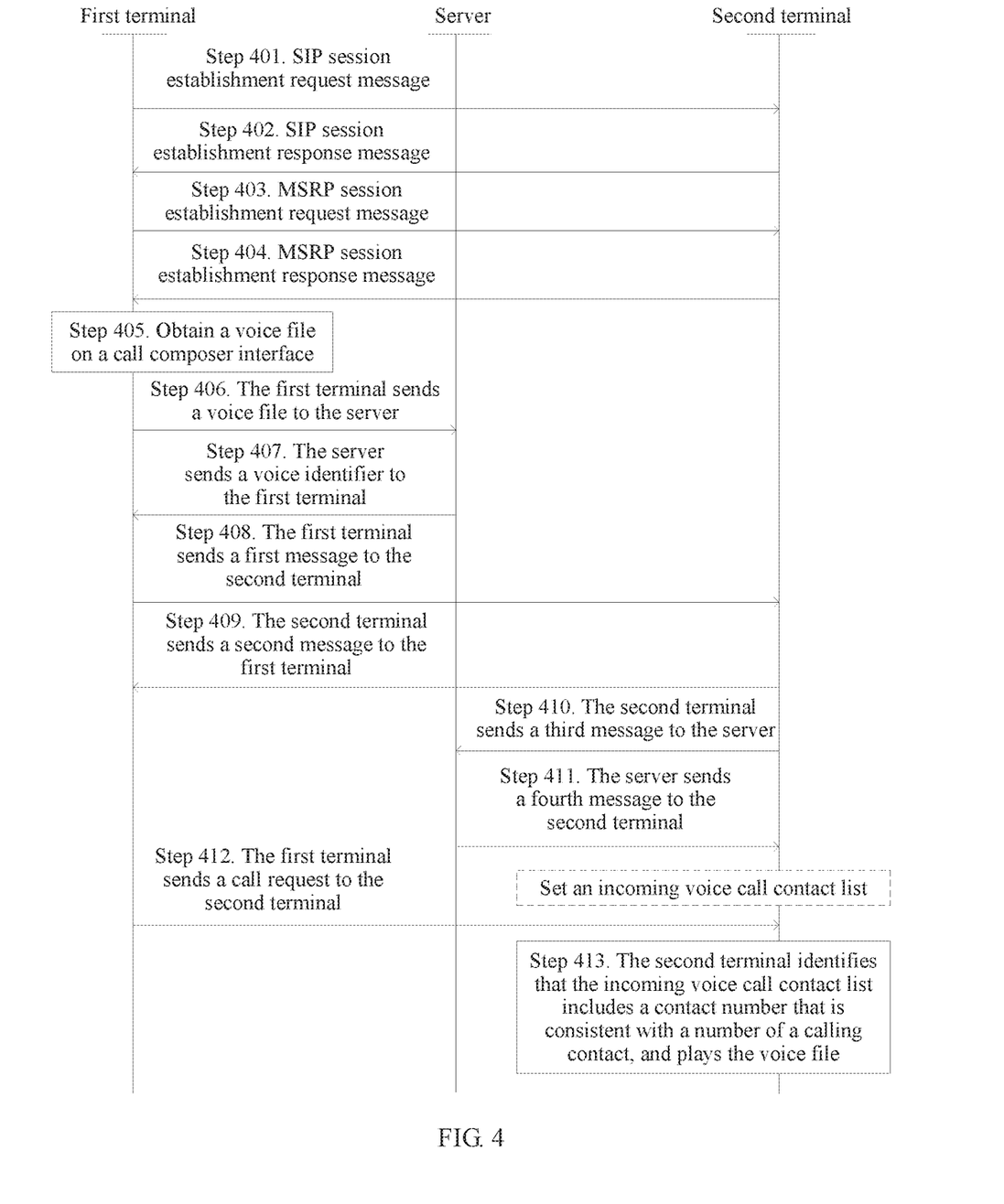
FIG. 4 is a schematic flowchart of an incoming voice calling method according to an embodiment of the present invention.

FIG. 4 is a schematic flowchart of an incoming voice calling method according to an embodiment of the present invention. As shown in FIG. 4, the method may include the following steps.

Step 401. A first terminal sends a SIP session establishment request message to a second terminal.

Before the first terminal initiates a call to the second terminal, the first terminal opens a call composer interface in response to an operation of a user. In this case, the first terminal is triggered to send the SIP session establishment request message to the second terminal, where the SIP session establishment request message may include identification information of the call composer, for example, an IMS communication service identifier (IMS Communication Service Identifier, ICSI).

Step 402. The second terminal sends a SIP session establishment response message to the first terminal, to complete SIP session establishment between the first terminal and the second terminal.

Step 403. The first terminal sends an MSRP session establishment request message to the second terminal.

Because an MSRP protocol is used for file or data transmission in a SIP protocol, the first terminal needs to establish an MSRP session with the second terminal, to transmit a file or data by using the MSRP session.

Step 404. The second terminal sends an MSRP session establishment response message to the first terminal, to complete MSRP session establishment between the first terminal and the second terminal.

Step 405. The first terminal obtains a voice file on a call composer interface.

Figure 5A:
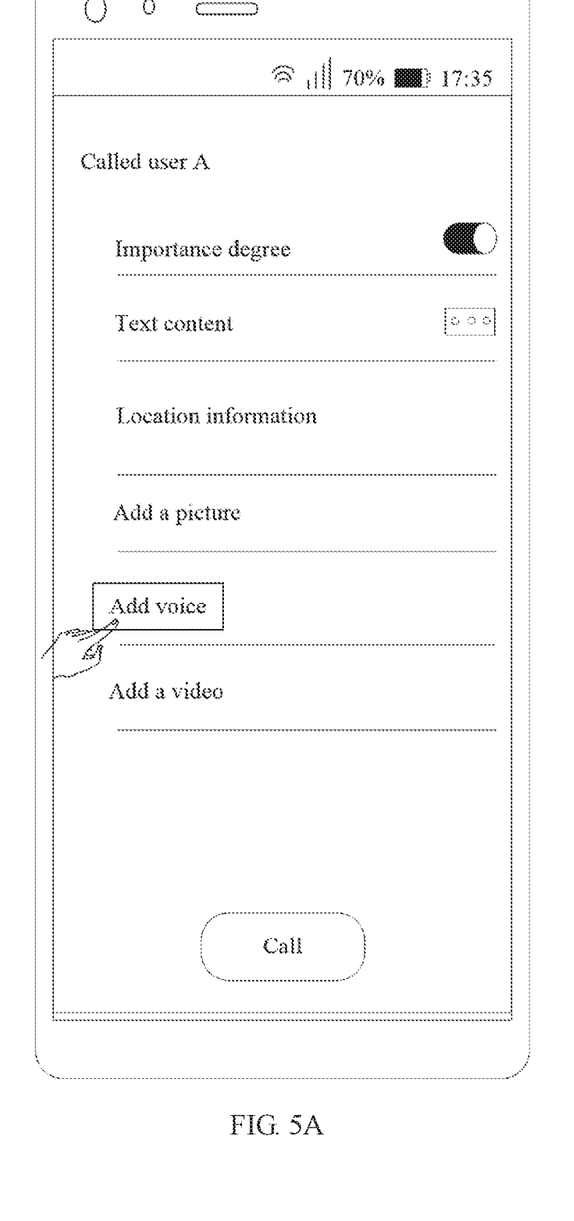
FIG. 5A is a schematic structural diagram of a terminal according to an embodiment of the present invention.

The user of the first terminal records, on the call composer interface, voice input by the user, to obtain the voice file. As shown in FIG. 5A, on the call composer interface, after the user of the first terminal edits importance degree information "important" (text content, picture information, and location information are not edited) of a current call based on an individual requirement, the user of the first terminal clicks a voice adding option, the first terminal enters a recording interface shown in FIG. 5B, and the user of the first terminal starts recording, and returns to the call composer interface after completing recording. A recorded voice file "voice 1" is added after the voice adding option is clicked.

The voice file may include voice content and a voice name, the voice content is call intention information of the first terminal of calling the second terminal, and the voice name is a name automatically allocated by the first terminal to the voice content.

Figure 5B:
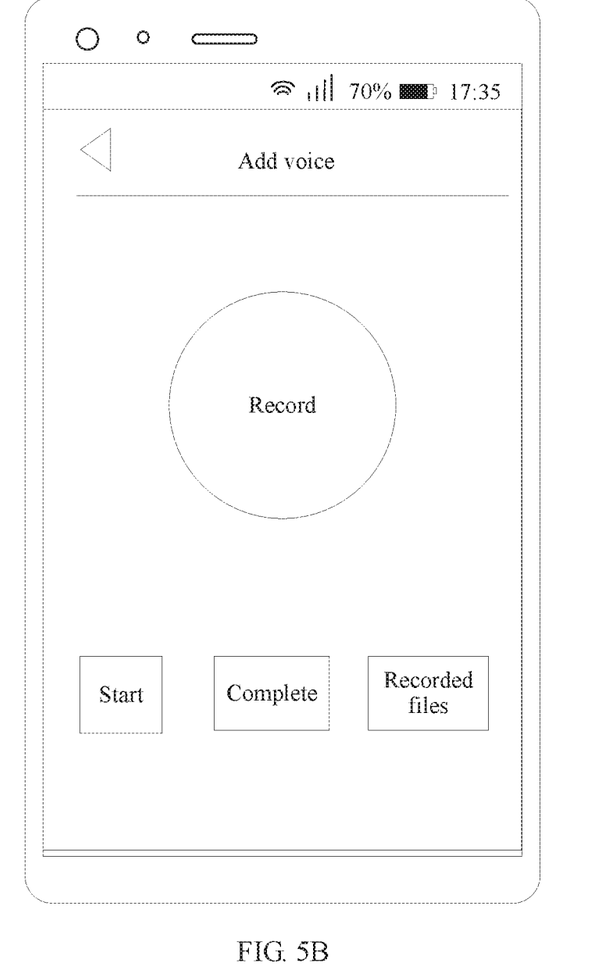
FIG. 5B is a schematic structural diagram of another terminal according to an embodiment of the present invention.

Optionally, the user of the first terminal may record the voice file and obtain the voice name before the first terminal enters the call composer interface, and search "recorded files" shown in FIG. 5B for a needed voice file after the first terminal enters the call composer interface.

A voice recording operation is added on the call composer interface, so that a limitation of conventional characters is overcome, and integrity of a call intention is improved.

Optionally, the voice file may further include a recording time.

Optionally, the recording time of the voice file may be automatically set based on a length of the voice content and a ringing time of the second terminal, and may be set to one minute.

Step 406. The first terminal sends the voice file to a server.

The first terminal may send the voice file to the server on a dial-up interface by using an HTTP-POST message, so that the server obtains the voice file recorded by the first terminal.

Optionally, before the first terminal sends the voice file to the server, the first terminal may set a contact category list, where the contact category list includes at least one type of contact group, for example, a family group or a colleague group.

In an example, the user of the first terminal may send a same voice identifier to a same category of contacts in the contact category list set by the first terminal. For example, the user of the first terminal sends a voice identifier A whose voice content is "come home for dining immediately" to a family member in the family group, and when the user of the first terminal intends to send the same voice content to another family member in the family group in this case, the user may locally select the voice identifier A and send the voice identifier A to the family member.

Optionally, the voice file may be a voice file recorded by the user; or the voice file may be a voice file downloaded by the user from the server, to provide a plurality of multimedia file obtaining manners for the user.

The voice file may include user characteristic information of the first terminal, and the user characteristic information may include information such as exercise data of the user and a current mood of the user. For the user characteristic information, corresponding data may be obtained by using a sensor in the first terminal, and the first terminal stores the data in a multimedia file.

In an example, for a user who has just finished exercising, the sensor of the first terminal of the user may obtain exercise amount information of the user. When the user sets a call intention reminder on the call composer interface, the first terminal may store the obtained exercise amount information in a voice file, to notify the user of the second terminal of the exercise amount information.

Step 407. The server sends a voice identifier corresponding to the voice file to the first terminal.

The voice identifier may be address information allocated by the server to the voice file, for example, a uniform resource locator (Uniform Resource Locator, URL). Before the server sends the voice identifier to the first terminal, the server needs to allocate an address to the obtained voice file for storage.

The server sends a response message of the HTTP-POST message to the first terminal, where the response message may include a voice identifier (for example, a URL).

The response message is used to indicate that the server has successfully processed the HTTP-POST message, and the response message is a returned status code 200, where the status code 200 indicates that the server has successfully processed the HTTP-POST message.

Step 408. The first terminal sends the voice identifier to the second terminal.

The first terminal may send a first message to the second terminal, where the first message may include the voice identifier.

The first message may be an MSRP send message, that is, the first terminal may send the voice identifier to the second terminal by using the MSRP send message. The first message is used to instruct the second terminal to obtain the voice file corresponding to the voice identifier from the server.

Optionally, within a preset time period, the first terminal may send a same voice identifier to the second terminal, or the first terminal may send a same multimedia identifier to the same second terminal.

In an example, the preset time may be a period of time, for example, a spring festival period. In the spring festival period, the first terminal may send a voice identifier representing "Happy New Year" to each contact second terminal, or in the spring festival period, the first terminal may send a voice identifier representing "Happy New Year" to a specified second terminal each time.

Optionally, within a preset time period, the first terminal has sent at least two multimedia files to the server, and the first terminal has received at least two multimedia file identifiers; and the first terminal sends, to the second terminal, a multimedia identifier specified by the first terminal.

In an example, when the first terminal contacts the second terminal for a plurality of times, that is, the first terminal has sent at least two multimedia files to the server, and has sent a voice identifier representing a different call intention each time. When a user of the second terminal has not received the voice identifier, during a last dial-up call, the first terminal may send, to the second terminal, a multimedia identifier that is considered by the user of the first terminal as important; or the first terminal sends a voice identifier that is obtained by the first terminal at a last time point, that is, a latest voice identifier received by the first terminal.

Step 409. The second terminal sends a second message to the first terminal, where the second message is a response message of the first message, to indicate, to the first terminal, that the second terminal has received the first message and has obtained the voice identifier.

The second message may be an MSRP send message.

Step 410. The second terminal sends a third message to the server, where the third message is used to obtain the voice file corresponding to the voice identifier.

The third message may include the voice identifier.

The second terminal may send an HTTP-GET message to the server, and the server searches for and obtains the voice file corresponding to the voice identifier.

Step 411. The server sends a fourth message to the second terminal, where the fourth message includes the voice file corresponding to the voice identifier.

The fourth message is a response message of the third message, and the message includes the voice file. To be specific, the second terminal downloads the voice file and stores the voice file locally, and the second terminal supports an audio format of the voice file.

The fourth message may be a returned status code 200.

Step 412. The first terminal sends a call request to the second terminal, so that the second terminal plays the voice file.

Optionally, before performing this step, the second terminal sends notification information to the first terminal, where the notification information is used to notify the first terminal that the second terminal completes downloading of the voice file.

The call request may include a telephone number of a calling contact.

Optionally, for security consideration, before this step is performed or step 401 is performed, the second terminal may perform determining based on an actual status, and if the second terminal determines that a call number of the first terminal is a preset contact number, the second terminal sets an incoming voice contact list in a contact list of the second terminal, and stores the incoming voice contact list, where the incoming voice contact list may include at least one contact and a corresponding number. In this manner, consistency matching is performed with a contact number in an incoming voice allowed contact list that is set, to improve call security.

Step 413. The second terminal plays a multimedia file after identifying that an incoming voice contact list includes a contact number that is consistent with a number of a calling contact.

The second terminal identifies whether the incoming voice contact list includes a contact number that is consistent with the number of the calling contact.

If the incoming voice contact list includes the contact number that is consistent with the number of the calling contact, the second terminal plays the obtained voice file on an incoming call interface; or if the second terminal determines that the user of the first terminal is a preset user, the second terminal plays the voice file.

If the incoming voice contact list does not include a contact number that is consistent with the number of the calling contact, the second terminal plays a normal incoming call ringtone.

The voice identifier and the call request may be sent separately, or the voice identifier and the call request may be sent together. In this case, when the second terminal plays the voice file, the voice file may be downloaded from the server in real time and then played, that is, the voice file may be played while being downloaded, or the voice file may be downloaded in advance and played locally, so that the first terminal selects the voice identifier.

It should be noted that if the multimedia file is a voice file, the second terminal plays the voice file as an incoming call ringtone; or if the multimedia file is a voice file, the second terminal plays the voice file as an incoming call ringtone, and displays a preset image on the incoming call interface; or if the multimedia file is a video file, the second terminal plays the video file; or if the multimedia file is a video file, the second terminal displays an image of the video file, and plays voice of the video file as an incoming call ringtone.

Optionally, the multimedia file may be a multimedia file that is set by the user based on a preset multimedia template, to provide a plurality of customized multimedia file forms for the user. To be specific, different file forms may be set for the multimedia file according to the user, to enhance user favorability to a terminal.

Optionally, after identifying that the incoming voice contact list stores the contact number that is consistent with the number of the calling contact, the second terminal may further identify whether a time difference between a recording time of the voice file and a current time is greater than a preset time threshold, and if the time difference is greater than the preset time threshold, the second terminal gives up playing the voice file, and plays a normal incoming call ringtone, or if the time difference is not greater than the preset time threshold, the second terminal plays the voice file.

For example, the preset time threshold is 20 minutes, and if the time difference between the recording time of the voice file and the current time is five minutes, the second terminal plays the voice file on the incoming call interface; if the time difference between the recording time of the voice file and the current time is 30 minutes, the second terminal plays the incoming call ringtone on the incoming call interface.

It can be learned that the user of the first terminal records voice on the call composer interface before making a call, to improve rapidity of an operation. The call intention information is played to the second terminal through voice, so that the user of the second terminal obtains the call intention information in time, thereby improving user experience.

Figure 6:
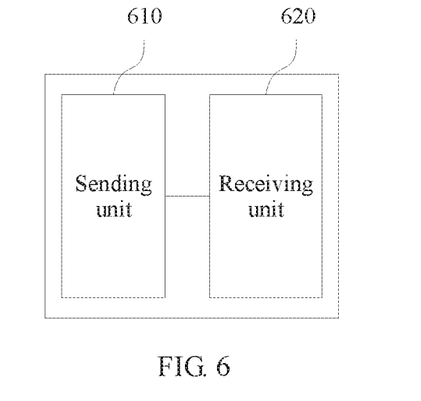
FIG. 6 is a schematic structural diagram of a terminal according to an embodiment of the present invention.

In correspondence to the foregoing method, the present invention provides a terminal. As shown in FIG. 6, the terminal may include a sending unit 610 and a receiving unit 620.

The sending unit 610 is configured to send a multimedia file to a server.

The receiving unit 620 is configured to receive a multimedia identifier sent by the server, where the multimedia identifier is used to represent a location of the multimedia file in the server.

The sending unit 610 is further configured to send the multimedia identifier to a second terminal.

The sending unit 610 is further configured to send a call request to the second terminal, so that the second terminal plays the multimedia file on an incoming call interface based on the call request.

Optionally, the terminal further includes: a setting unit 630.

The setting unit 630 is configured to set at least one contact category list.

The sending unit 610 is configured to send a same multimedia identifier to a same category of contacts.

Optionally, the sending unit 610 is further configured to send a same multimedia identifier to the second terminal within a preset time period.

Optionally, the sending unit 610 is further configured to: when the sending unit 610 has sent at least two multimedia files to the server, and the receiving unit 620 has received at least two multimedia file identifiers within a time period, send, to the second terminal, a multimedia identifier specified by the first terminal, or send, to the second terminal, a multimedia identifier that is obtained by the terminal at a last time point.

Optionally, the multimedia file is a multimedia file recorded by an user, or the multimedia file is a multimedia file downloaded by a user from the server.

Optionally, the multimedia file includes user characteristic information, and the sending unit 610 is specifically configured to send, to the server, the multimedia file carrying the user characteristic information.

Optionally, the multimedia file is a multimedia file that is set by the user based on a preset multimedia template.

Optionally, the sending unit 610 is specifically configured to send the multimedia file on a dial-up interface.

For problem-resolving implementations and beneficial effects of the units of the terminal in the foregoing embodiment, refer to the implementations and the beneficial effects of the method. Therefore, details are not described herein again.

Figure 7:
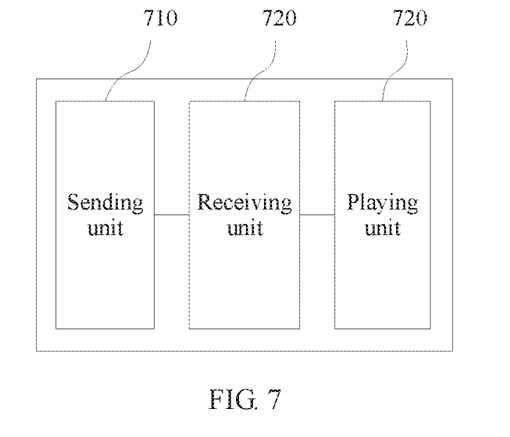
FIG. 7 is a schematic structural diagram of another terminal according to an embodiment of the present invention.

In correspondence to the foregoing method, the present invention provides another terminal. As shown in FIG. 7, the terminal may include: a receiving unit 710, a sending unit 720, and a playing unit 730.

The receiving unit 710 is configured to receive a multimedia identifier sent by a second terminal, where the multimedia identifier is used to represent a location of a multimedia file in a server.

The sending unit 720 is configured to send the multimedia identifier to the server.

The receiving unit 710 is further configured to receive the multimedia file sent by the server.

The receiving unit 710 is further configured to receive a call request sent by the second terminal, where the call request includes a call number of the second terminal.

The playing unit 730 is configured to play the multimedia file.

Optionally, the terminal further includes: a determining unit 740, a configuration unit 750, and an identification unit 760.

If the determining unit 740 determines that the call number of the second terminal is a preset contact number, the playing unit 730 plays the multimedia file; or if the determining unit 740 determines that a user of the second terminal is a preset user, the playing unit 730 plays the multimedia file.

Optionally, the playing unit 730 is further configured to: if the multimedia file is a voice file, play the voice file as an incoming call ringtone; or if the multimedia file is a voice file, play the voice file as an incoming call ringtone, and display a preset image on an incoming call interface; or if the multimedia file is a video file, play the video file; or if the multimedia file is a video file, display an image of the video file, and play voice of the video file an incoming call ringtone.

Optionally, the receiving unit 710 is configured to: when there are a plurality of multimedia identifiers, receive a multimedia identifier specified by the second terminal; or receive a multimedia identifier that is sent by the second terminal at a last time point.

Optionally, the playing unit 730 is further configured to: download the multimedia file, and then play the multimedia file, or play the multimedia file in a process of downloading the multimedia file.

For problem-resolving implementations and beneficial effects of the units of the terminal in the foregoing embodiment, refer to the implementations and the beneficial effects of the method. Therefore, details are not described herein again.

Figure 8:
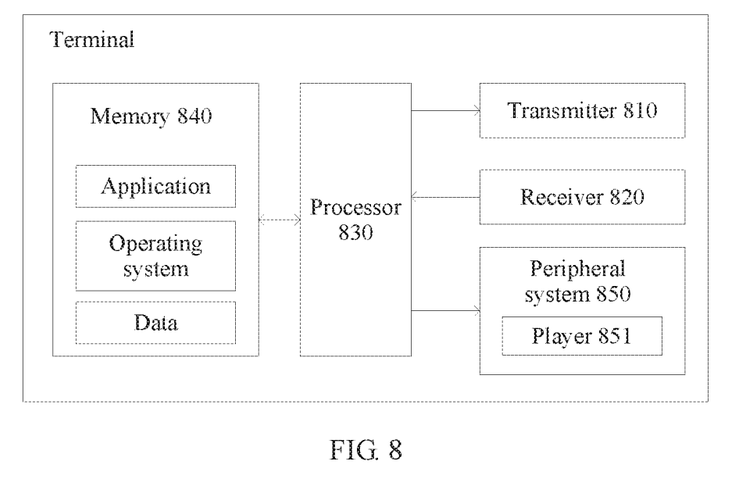
FIG. 8 is a schematic structural diagram of still another terminal according to an embodiment of the present invention.

FIG. 8 is a schematic structural diagram of still another terminal according to an embodiment of the present invention. As shown in FIG. 8, the terminal may include: a transmitter 810, a receiver 820, a processor 830, a memory 840, and a peripheral system 850.

The processor 830 may be a central processing unit (central processing unit, CPU), or a combination of a CPU and a hardware chip. The hardware chip may be an application-specific integrated circuit (application-specific integrated circuit, ASIC), a programmable logic device (programmable logic device, PLD), or a combination thereof. The PLD may be a complex programmable logical device (complex programmable logic device, CPLD), a field-programmable gate array (field-programmable gate array, FPGA), a generic array logic (generic array logic. GAL), or any combination thereof.

The memory 840 is configured to store various applications (for example, a social application), an operating system, and data (for example, contact lists in various forms). The memory 840 may be further configured to store a network communication program, where the network communication program may be used to communicate with one or more additional devices, one or more terminal devices, and one or more network devices. The memory 840 may further store a user interface program, where the user interface program may vividly display content of an application through a graphical operation interface, and receive, by using input controls such as a menu, a dialog box, and a button, a control operation performed by a user on the application. The memory 840 may be connected to the processor 830 by using a bus, and transmit stored data to the processor 830. The memory 840 may include a volatile memory such as a nonvolatile dynamic random access memory (nonvolatile random access memory, NVRAM), a phase change random access memory (phase change RAM, PRAM), or a magnetoresistive random access memory (magnetoresistive RAM, MRAM), or may include a nonvolatile memory such as at least one magnetic disk storage device, an electrically erasable programmable read-only memory (electrically erasable programmable read-only memory, EEPROM), a flash memory device such as an NOR flash memory (NOR flash memory) or an NAND flash memory (NAND flash memory), or a semiconductor device such as a solid state disk (solid state disk, SSD). The memory 840 may further include a combination of the foregoing types of memories. The memory 840 stores a software program and a device driver. The software program can execute various functions of the foregoing method in the present invention, and the device driver may be a network and interface driver. It may be understood that the memory 840 may be integrated into the processor 830, or may exist independently. The receiver 820 and the transmitter 810 may be integrated into a transceiver, or may exist independently.

The peripheral system 850 is mainly used to implement a function of interaction between the terminal and a user/external environment, includes an input/output apparatus of the terminal, and may be coupled to a corresponding peripheral device (for example, a player 851). It should be noted that the peripheral system 850 may further include another I/O peripheral. The player 851 is configured to play a multimedia file stored in the memory 840.

A recorder is used as an example below, and an operating process of each component is as follows:

The transmitter 810 is configured to send the multimedia file to a server.

The receiver 820 is configured to receive a multimedia identifier sent by the server, where the multimedia identifier is used to represent a location of the multimedia file in the server.

The transmitter 810 is further configured to send the multimedia identifier to a second terminal.

The transmitter 810 is further configured to send a call request to the second terminal, so that the second terminal plays the multimedia file by using the player 851.

For problem-resolving implementations and beneficial effects of the components of the terminal in the foregoing embodiment, refer to the implementations and the beneficial effects. Therefore, details are not described herein again.

Figure 9:
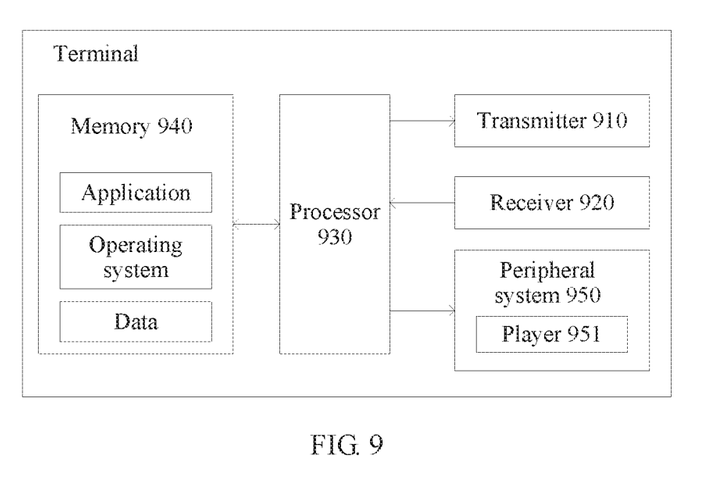
FIG. 9 is a schematic structural diagram of still another terminal according to an embodiment of the present invention.

FIG. 9 is a schematic structural diagram of still another terminal according to an embodiment of the present invention. As shown in FIG. 9, the terminal may include: a transmitter 910, a receiver 920, a processor 930, a memory 940, and a peripheral system 950.

The processor 930 may be same as or different from the processor 830 described above, and this is not limited herein.

The memory 940 is configured to store various applications, an operating system, and data.

The memory 940 may transmit the stored data to the processor 930. The memory 940 may be the same as or different from the memory 840 described above, and this is not limited herein.

The peripheral system 950 is mainly used to implement a function of interaction between the terminal and a user/external environment, includes an input/output apparatus of the terminal, and may be coupled to a corresponding peripheral device (for example, a player 951). It should be noted that the peripheral system 950 may further include another I/O peripheral. The player 951 is configured to play a multimedia file stored in the memory 940.

An operation process of each component is as follows:

The receiver 920 is configured to receive a multimedia identifier of a second terminal, where the multimedia identifier is used to represent location information of a multimedia file in a server.

The transmitter 910 is configured to send the multimedia identifier to the server.

The receiver 920 is further configured to receive the multimedia file sent by the server.

The receiver 920 is further configured to receive a call request sent by the second terminal.

The player 951 is configured to play the multimedia file.

For problem-resolving implementations and beneficial effects of the components of the terminal in the foregoing embodiment, refer to the implementations and the beneficial effects of the method. Therefore, details are not described herein again It should be noted that an embodiment of the present invention further provides a computer readable storage medium. The computer readable storage medium stores a computer program, and the program is executed by a processor.

An embodiment of the present invention further provides a computer program product including an instruction. When the computer program product is run on a computer, a processor is enabled to perform the method in FIG. 4.

Steps of methods or algorithms described in the embodiments disclosed with reference to this specification may be implemented by hardware, a software module executed by a processor, or a combination thereof. A software instruction may include a corresponding software module, and the software module may be stored in a random access memory, a flash memory, a read-only memory, an erasable programmable read-only memory (erasable programmable read-only memory, EPROM) memory, an electrically erasable programmable read-only memory (English: electrically erasable programmable read-only memory, EEPROM), a hard disk, an optical disc, or a storage medium in any other form well-known in the art. In an example, a storage medium is coupled to a processor, so that the processor can read information from the storage medium or write information into the storage medium. The storage medium may be a part of the processor. The processor and the storage medium may alternatively exist in user equipment as discrete components.

Objectives, technical solutions, and beneficial effects of this application are further described in detail in the foregoing specific implementations, and it should be understood that the foregoing descriptions are merely specific implementations of this application, but are not intended to limit the protection scope of this application, and any modification, improvement, or the like made based on the technical solutions of this application shall fall within the protection scope of this application.

What is claimed is:

1. A system comprising:
a first terminal configured to:
displaying a call composer interface, wherein the call composer interface sets attribute information, wherein the attribute information comprises an importance degree of a call, text content, picture information, location information, and a multimedia file, and wherein the multimedia file comprises at least one of a voice file or a video file;
obtain the multimedia file from the call composer interface;
send the multimedia file to a server on a dial-up interface;
receive a multimedia identifier from the server in response to sending the multimedia file, wherein the multimedia identifier represents a location of the multimedia file in the server;
send the multimedia identifier; and
send a call request; and
a second terminal configured to:
receive the multimedia identifier from the first terminal;
receive the call request from the first terminal;
play, in response to the call request, the voice file as an incoming call ringtone when the multimedia file is the voice file; or
display, in response to the call request, an image of the video file and play voice of the video file as the incoming call ringtone when the multimedia file is the video file,
wherein sending the multimedia identifier comprises sending the multimedia identifier specified by the first terminal to the second terminal or sending the multimedia identifier that is obtained by the first terminal at a last time point to the second terminal when the first terminal sends at least two multimedia files to the server and receives at least two multimedia file identifiers within a preset time period.

2. The system of claim 1, wherein before sending the multimedia file to the server, the first terminal is further configured to:
set at least one contact category list; and
send the multimedia identifier to the second terminal by sending a same multimedia identifier to a same category of contacts.

3. The system of claim 1, wherein the first terminal is further configured to send the multimedia identifier to the second terminal by sending a same multimedia identifier to the second terminal within the preset time period.

4. The system of claim 1, wherein the multimedia file is recorded by a user, or wherein the multimedia file is downloaded by the user from the server.

5. The system of claim 1, wherein the multimedia file comprises user characteristic information of the first terminal.

6. The system of claim 5, wherein the user characteristic information comprises at least one of exercise data of a user or a mood of the user.

7. The system of claim 1, wherein the multimedia file is set by a user based on a preset multimedia template.

8. A terminal, comprising:
a processor; and
a memory coupled to the processor and storing programming instructions for execution by the processor, wherein the programming instructions cause the terminal to:
display a call composer interface, wherein the call composer interface sets attribute information, wherein the attribute information comprises an importance degree of a call, text content, picture information, location information, and a multimedia file, and wherein the multimedia file comprises at least one of a voice file or a video file;
obtain the multimedia file from the call composer interface;
send the multimedia file to a server on a dial-up interface;
receive a multimedia identifier from the server, wherein the multimedia identifier represents a location of the multimedia file in the server;
send the multimedia identifier to a second terminal; and
send a call request to the second terminal,
wherein in a manner to send the multimedia identifier to the second terminal, the programming instructions further cause the terminal to send the multimedia identifier specified by the first terminal to the second terminal, or send the multimedia identifier that is obtained by the first terminal at a last time point to the second terminal when first terminal sends at least two multimedia files to the server and receives at least two multimedia file identifiers within a preset time period.

9. The terminal of claim 8, wherein before the terminal sends the multimedia file to the server, the programming instructions further cause the terminal to be configured to set at least one contact category list, and wherein the terminal is configured to send the multimedia identifier to the second terminal by sending a same multimedia identifier to a same category of contacts.

10. The terminal of claim 8, wherein the terminal is configured to send the multimedia identifier to the second terminal by sending a same multimedia identifier to the second terminal within the preset time period.

11. The terminal of claim 8, wherein the multimedia file is recorded by a user, or wherein the multimedia file is downloaded by the user from the server.

12. The terminal of claim 8, wherein the multimedia file comprises user characteristic information of the terminal.

13. The terminal of claim 12, wherein the user characteristic information comprises at least one of exercise data of a user or a mood of the user.

14. The terminal of claim 8, wherein the multimedia file is set by a user based on a preset multimedia template.

15. An incoming voice calling method, implemented by a first terminal, wherein the incoming voice calling method comprises:
displaying a call composer interface, wherein the call composer interface sets attribute information, wherein the attribute information comprises an importance degree of a call, text content, picture information, location information, and a multimedia file, and wherein the multimedia file comprises at least one of a voice file or a video file;
obtaining the multimedia file via the call composer interface;
sending the multimedia file to a server on a dial-up interface;
receiving a multimedia identifier from the server, wherein the multimedia identifier represents a location of the multimedia file in the server;
sending the multimedia identifier to a second terminal;
sending a call request to the second terminal; and playing, by the second terminal, the voice file as an incoming call ringtone when the multimedia file is the voice file in response to the call request; or displaying, by the second terminal, an image of the video file and playing, by the second terminal, voice of the video file as the incoming call ringtone when the multimedia file is the video file in response to the call request, wherein sending the multimedia identifier to the second terminal comprises sending the multimedia identifier specified by the first terminal to the second terminal or sending the multimedia identifier that is obtained by the first terminal at a last time point to the second terminal when the first terminal sends at least two multimedia files to the server and receives at least two multimedia file identifiers within a preset time period.

16. The incoming voice calling method of claim 15, wherein before sending the multimedia file to the server, the incoming voice calling method further comprises setting at least one contact category list, and wherein sending the multimedia identifier to the second terminal comprises sending a same multimedia identifier to a same category of contacts.

17. The incoming voice calling method of claim 15, wherein the multimedia file is recorded by a user, or wherein the multimedia file is downloaded by the user from the server.

18. The incoming voice calling method of claim 15, wherein the multimedia file comprises user characteristic information of the first terminal, and wherein the user characteristic information comprises at least one of exercise data of a user or a current mood of the user.

19. The incoming voice calling method of claim 15, wherein the multimedia file is set by a user based on a preset multimedia template.

20. The incoming voice calling method of claim 15, further comprising sending the multimedia identifier to the second terminal using a message session relay protocol (MSRP) message.

\* \* \* \* \*